(12) United States Patent
Hikmet et al.

(10) Patent No.: US 6,444,368 B1
(45) Date of Patent: Sep. 3, 2002

(54) LITHIUM BATTERY COMPRISING A GEL-ELECTROLYTE

(75) Inventors: Rifat Ata Mustafa Hikmet; Hans Feil, both of Eindhoven (NL)

(73) Assignee: Koninklijke Phillips Electronics N.V., Eindhoven (NL)

( * ) Notice: Subject to any disclaimer, the term of this patent is extended or adjusted under 35 U.S.C. 154(b) by 25 days.

(21) Appl. No.: 09/710,913

(22) Filed: Nov. 13, 2000

(30) Foreign Application Priority Data

Nov. 11, 1999 (EP) ............................................. 99203772
Mar. 7, 2000 (EP) ............................................. 00200814

(51) Int. Cl.[7] ............................ H01M 6/14; H01M 6/12
(52) U.S. Cl. ....................................... 429/300; 429/162
(58) Field of Search ................................ 429/127, 130, 429/142, 162, 188, 246, 300, 303

(56) References Cited

U.S. PATENT DOCUMENTS 5,019,468 A * 5/1991 Miyabayashi ............... 429/241
5,681,357 A * 10/1997 Eschbach et al. ........... 29/623.4
6,103,417 A * 8/2000 Rapeli ......................... 429/143

FOREIGN PATENT DOCUMENTS

WO    WO0004601    7/1999

* cited by examiner

*Primary Examiner*—Carol Chaney
*Assistant Examiner*—Donald V. Scaltrito
(74) *Attorney, Agent, or Firm*—Dicran Halajian

(57) ABSTRACT

A lithium battery includes a negative electrode, a positive electrode, a separator, and a non-aqueous electrolyte solution between the negative and the positive electrodes. At least the negative electrode material and the positive electrode material are provided with a pattern of holes which accommodate a polymeric material which sticks and presses the negative electrode, the positive electrode and the separator together. In order to decrease the tendency of the electrolyte solution to sublime, thereby expanding the packaging material around the battery, the non-aqueous electrolyte solution comprises a solution of lithium salts, solvent molecules and a polymer, forming a gel-electrolyte.

2 Claims, 1 Drawing Sheet

LITHIUM BATTERY COMPRISING A GEL-ELECTROLYTE

FIELD OF THE INVENTION

The invention relates to a lithium battery, at least comprising:

a negative electrode, comprising negative electrode material and a negative current collector;

a positive electrode, comprising positive electrode material and a positive current collector; a separator, separating the negative electrode and the positive electrode; and a non-aqueous electrolyte solution between the negative and the positive electrode, wherein at least the negative electrode material and the positive electrode material are provided with a pattern of holes which accommodate a polymeric material which sticks and presses the negative electrode, the positive electrode and the separator together.

BACKGROUND OF THE INVENTION

Due to a growing market for lightweight, portable cordless consumer products, such as CD-players, mobile telephones, laptop computers and video cameras, there is an increased need for high-density batteries. Specifically, very thin and flexible batteries are required. In order to provide for an acceptable portability, the batteries contained in said consumer products should provide the necessary amount of energy at the smallest possible weight and volume. However, the thinner the battery gets, the more difficult the application of pressure, which is needed to maintain sufficient contact between the respective components of the battery, becomes.

A battery according to the preamble is known from the International patent application with publication number 00/04601.

Said battery has thin and flexible form and provides at the same time a very high energy density. Moreover, the contact between the electrodes and the separator is obtained and maintained in a very efficient way. The battery can be packed in a thin walled can, as the walls of said can are not needed to maintain sufficient pressure on the respective components of the battery.

At higher temperatures the liquid electrolyte made up of low molecular weight organic molecules, sometimes tends to sublime, giving rise to the expansion of the packaging material around the battery.

SUMMARY OF THE INVENTION

It is an object of the invention to provide a battery according to the preamble, in which the above problem is avoided.

This object is achieved in a battery as specified in the preamble, characterized in that the non-aqueous electrolyte solution comprises a solution of lithium salts, solvent molecules and a polymer, forming a gel-electrolyte.

As a result of its lower vapour pressure, such gel-electrolyte will show a considerably reduced sublimation at higher temperatures, compared to the electrolyte used in the prior art. Therefore, by providing a gel-electrolyte between the positive and the negative electrode, it is prevented that the packaging material around the battery components expands at higher temperatures.

In order to decrease the tendency of the liquid electrolytes to sublime preferably polymeric gelling agents are used.

Such polymeric gelling agents can be brought into the battery stack, anode and cathode materials and/or into the separator separately. Various types of polymeric materials which can advantageously be used are described below in the exemplary embodiment In a preferred embodiment, the separator comprises the gel-electrolyte and more preferably consists of the gel-electrolyte.

In this latter embodiment, the gel-electrolyte has to have sufficient mechanical strength to act as a separator between the positive electrode and the negative electrode. The 'usual'. separator can then be omitted and can be replaced by the gel-electrolyte which then acts as a separator.

BRIEF DESCRIPTION OF THE DRAWINGS

Further features and advantages of the invention will become more readily apparent from a consideration of the following detailed description set forth with reference to the accompanying drawing, which specify and show a preferred embodiment of the invention; and in which.

DETAILED DESCRIPTION OF THE INVENTION

Figure 1A:
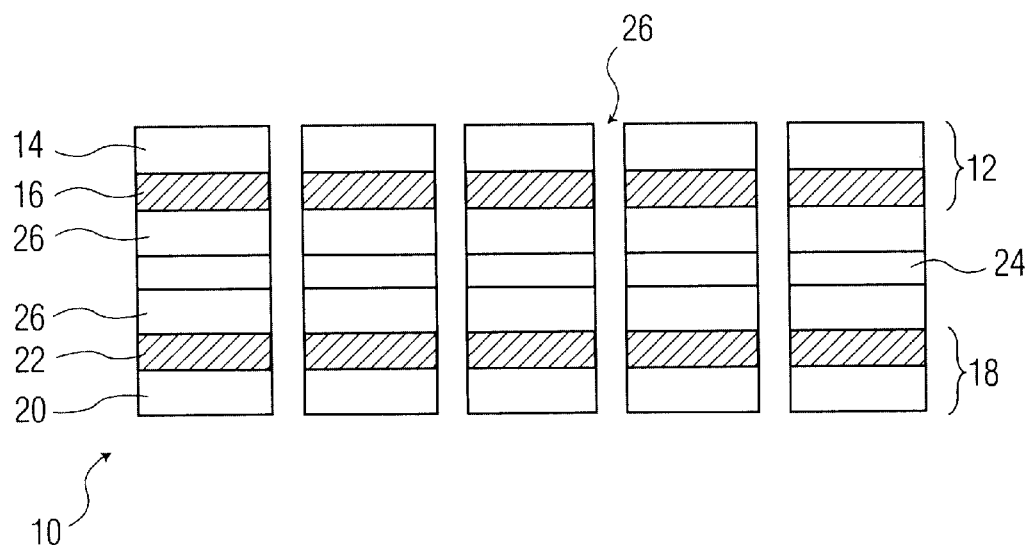
FIGS. 1A and 1B show a lithium battery according to the present invention.
Figure 1B:
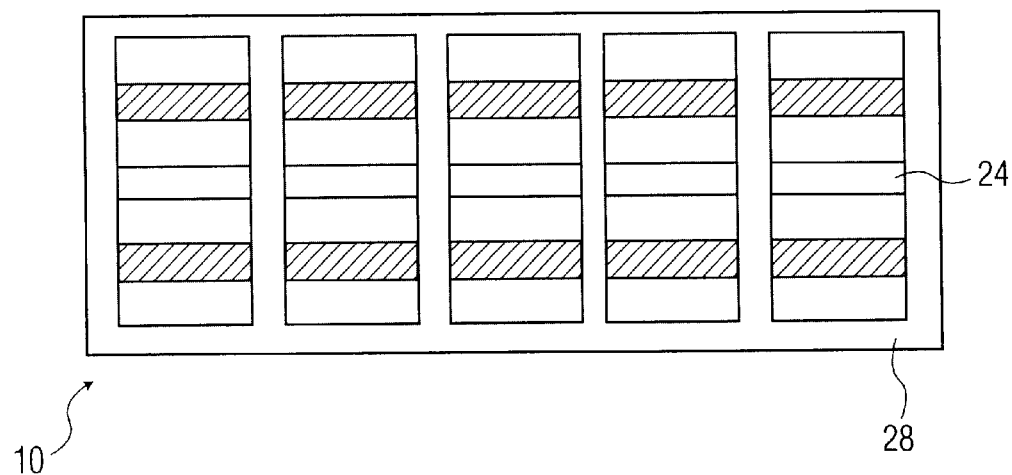

FIGS. 1A and 1B show a lithium battery 10 where a negative electrode 12 (also called anode) in the lithium battery 10 according to the invention basically comprises negative electrode active material 14 for the battery reaction and a negative current collector 16 serving to transmit electrons upon charging and discharging.

The negative electrode material preferably comprises an intercalatable material, preferably carbon, such as amorphous carbon or graphite, dispersed in a polymeric binder matrix. Lithium can be intercalated between crystal layers of carbon, for example in a quantity of 1 lithium atom per 6 carbon atoms, in other words $LiC_6$.

The positive electrode 18 (also called cathode) comprises positive electrode active material 20 and a positive current collector 22.

The positive electrode material can comprise a lithium intercalation compound, such as $LiMn_2O_4$, $LiCoO_2$ or $LiNiO_2$, dispersed in a polymeric binder matrix. The mixture also comprises a powdery conductive material, such as carbon black (e.g. acetylene black, thermal black), graphite powder, metal powder or the like. The amount of conductive material is in the range of 2 to 15% by weight.

For the binder matrix polymers are used, which include polysaccharide, thermoplastic polymers and polymers having rubber-like elasticity. Examples include carboxymethyl cellulose, polytetrafluoroethylene, polyethylene, polypropylene and styrene-butadiene rubber. The polymers may be used singly or in combination. The polymeric binder serves to bind together active material powders to prevent cracks and fix such powdery materials to the surface of the current collector. The amount of the polymeric binder is in the range of 2 to 30% by weight.

For the current collector use can be made of any electronic conductor provided that it does not induce chemical reactions in the battery. Examples of materials for the positive current collector (cathode) include stainless steel, aluminum and nickel. Examples of materials for the negative current collector (anode) include stainless steel, copper and nickel. The collector may be in the shape of a foil, film or sheet, and may be porous, punched or mesh-like. The thickness of the collector generally is in the range of 1 to 500 µm.

A separator 24 is provided between the positive and negative electrodes 18, 12. The separator 24 can be an insulated film having both high ion permeability and desired mechanical strength. It prevents short-circuits between the negative and the positive electrodes 12, 18, and holds an electrolytic solution 26 located between the negative and the positive electrodes 12, 18. A generally used separator 24 is made of glass fiber, or a porous sheet or non-woven fabric made of an olefin polymer such as polyethylene or polypropylene. The diameter of the pores generally is in the range of 0.01 to 10 μm. The thickness of the separator 24 generally is in the range of 5 to 300 μm. As mentioned in the above, the usual separator 24 can also be replaced by the gel electrolyte itself.

The battery structure of the present invention may be activated with any of the numerous compositions used as liquid electrolyte solutions. For the solvent an ester, such as ethylene carbonate, propylene carbonate, methylethylcarbonate; an ether, such as tetrahydrofurane; dimethyl sulfoxide, and mixtures thereof may be used. Examples of the solute include salts composed of lithium ions ($Li^+$) and Lewis acid ions ($BF_4^-$, $PF_6^-$, $AsF_6^{31}$, $ClO_4^-$, $CF_3SO_3^-$) and mixed salts thereof. The concentration of the salt is between 0.5 and 2 mol/l.

The battery is enclosed in a battery case, which may be a plastic metallic or a plastic resin case. Examples of these materials include stainless steel and plastics like polypropylene. The sealing may be made by an adhesive, welding or soldering. A flat flexible battery may be enclosed in an air and moisture-proof bag of polymer-coated aluminum foil. Sheets of such foil are commercially available, and can be sealed together at their edges. The sheets typically comprise an outer 15 μm polyester or polyethylene film, a 50 μm aluminum foil, and an inner 15 μm polyester or polyethylene film, bearing a 90 μm layer of heat sealing adhesive.

The invention will be elucidated in greater detail by means of an exemplary embodiment in which the various types of polymeric materials which can advantageously be used are described.

Exemplary Embodiment

A mixture for the negative electrode material is prepared by mixing 6 g graphite particles having a particle size of 10 μm as the active positive material, 4.5 g carboxymethyl cellulose (1% aqueous solution) and 0.5 g styrene butadiene rubber (60% dispersion in water) as a binder, and formed into a paste to be applied as a coating onto both surfaces of a copper foil current collector. The thickness of the coating is 200 μm. The thickness of the copper foil amounts to 14 μm. The pasted current collector is pre-dried at 85° C. for 15 minutes, heat-treated at 110° C. for 3 hours and then pressed until the thickness becomes 110 μm. The negative electrode is cut out so as to be a square of 2×2 cm².

A mixture for the positive electrode material is prepared by mixing 6 g $LiCoO_2$ as the active positive material, 0.18 g acetylene black as a conductive material, 5 g carboxymethyl cellulose (1% aqueous solution) and 0.7 g polytetrafluoroethylene (60% dispersion in water) as a binder, and formed into a paste to be applied as a coating onto both surfaces of an aluminum foil current collector. The thickness of the coating is 420 μm. The thickness of the aluminum foil amounts to 20 μm. The pasted current collector is pre-dried at 85° C. for 15 minutes, heat-treated at 250° C. for 4 hours and then pressed until the thickness becomes 100 μm. The positive electrode is cut out so as to be a square of 2×2 cm²

A 25 μm thick porous polyethylene foil is used as a separator.

The negative electrode 12 and the positive electrode 18 are each provided with a pattern of holes 26 by mechanical punching. The diameter of the holes 26 is generally about 1 mm. The holes 26 are provided in a two-dimensional array with a mutual hole distance of 5 mm.

In order to manufacture a lithium battery according to the invention, a stack is formed of the negative electrode, the separator and the positive electrode.

Subsequently, a polymeric gelling agent 28 is brought into the battery stack; into the anode and cathode materials and/or separately into the separator. Thereupon the battery is activated by bringing in electrolyte into the battery. Preferably, the following types of polymeric gelling agents are used:

A) In order to produce a chemically cross-linked polymer, a precursor with reactive groups can be used. Examples of such molecules are molecules with the general structure:

in which:
X=Y=acrylate, epoxy, vinyl ether or thiolene
X or Y=CH3
B=long chain molecule, such as:

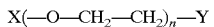

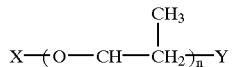

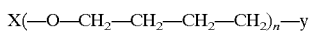

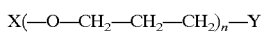

Molecules with reactive groups are dissolved in a solvent and brought into the components of the battery. The reactive end groups can chosen to be acrylate, epoxy, vinyl ether or thiolene. The reactive molecules may be mono or multi functional. Mono fluctional molecules should always be used in combination with multi-functional molecules in order to obtain cross-linking. The polymerization can be induced using high energy radiation such as electrons and gamma rays or thermal initiator in the presence of the solvent or after drying. In all cases samples are dried before activating the battery. In the activation process when electrolyte is brought into the battery the cross-linked polymer becomes swollen by the electrolyte.

B) In order to produce physically cross-linked gels a semi-crystalline polymer or a copolymer is advantageously used. The polymer is dissolved in a solvent. The battery components are dipped into the solution. Subsequently the solvent is extracted or evaporated out of the system leaving a dry polymer behind. During the activation when the electrolyte is brought into the battery, partially swelling of the polymer occurs. This means that polymer chains remains physically connected to each other. The connection points are the crystallites or the parts of the copolymer which are not dissolved by the electrolyte. Examples of various polymers are the following:

1)
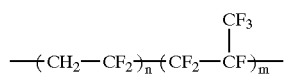

2)
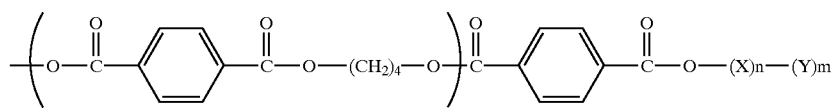

3)
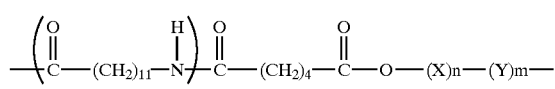

4)
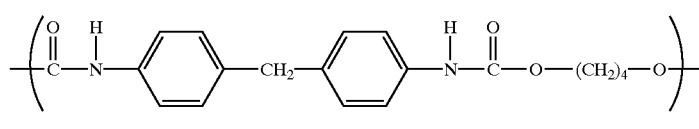

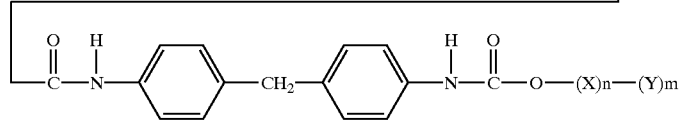

Examples of X and Y  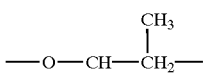

5)
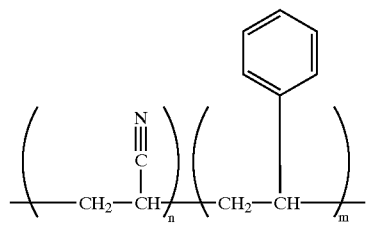

C) As a third preferred possibility, very high molecular weight polymer can be used. The polymer is brought into the battery components as described above. However in the present case when the battery is activated the polymer is dissolved in the electrolyte. Nevertheless due to the high molecular weight of the polymer it is highly entangled and it is highly viscous. Examples of polymer which can be used for this purpose are polymethylmethacrylate and polystyrene, polyvinyl methyl keton.

The polymers which are mentioned under A and B can also be used in producing separators. Such separators can also be used in combination with standard electrodes which do not contain gelling agents.

What is claimed is:

1. A lithium battery comprising:
   a negative electrode, comprising negative electrode material and a negative current collector;
   a positive electrode, comprising positive electrode material and a positive current collector;
   a separator, separating the negative electrode and the positive electrode; and
   a non-aqueous electrolyte solution between the negative and the positive electrode,
   wherein at least the negative electrode material and the positive electrode material are provided with a pattern of holes which accommodate a material which sticks and presses the negative electrode, the positive electrode and the separator together, characterized in that the non-aqueous electrolyte solution comprises a solution of lithium salts, solvent molecules and a polymer, forming a gel-electrolyte, wherein the polymer comprises a polymeric gelling agent.

2. A lithium battery comprising:
   a negative electrode, comprising negative electrode material and a negative current collector;
   a positive electrode, comprising positive electrode material and a positive current collector;
   a separator, separating the negative electrode and the positive electrode; and
   a non-aqueous electrolyte solution between the negative and the positive electrode,
   wherein at least the negative electrode material and the positive electrode material are provided with a pattern of holes which accommodate a material which sticks and presses the negative electrode, the positive electrode and the separator together, characterized in that the non-aqueous electrolyte solution comprises a solution of lithium salts, solvent molecules and a polymer, forming a gel-electrolyte, wherein the separator consists of the gel-electrolyte.

* * * * *